UNITED STATES PATENT OFFICE.

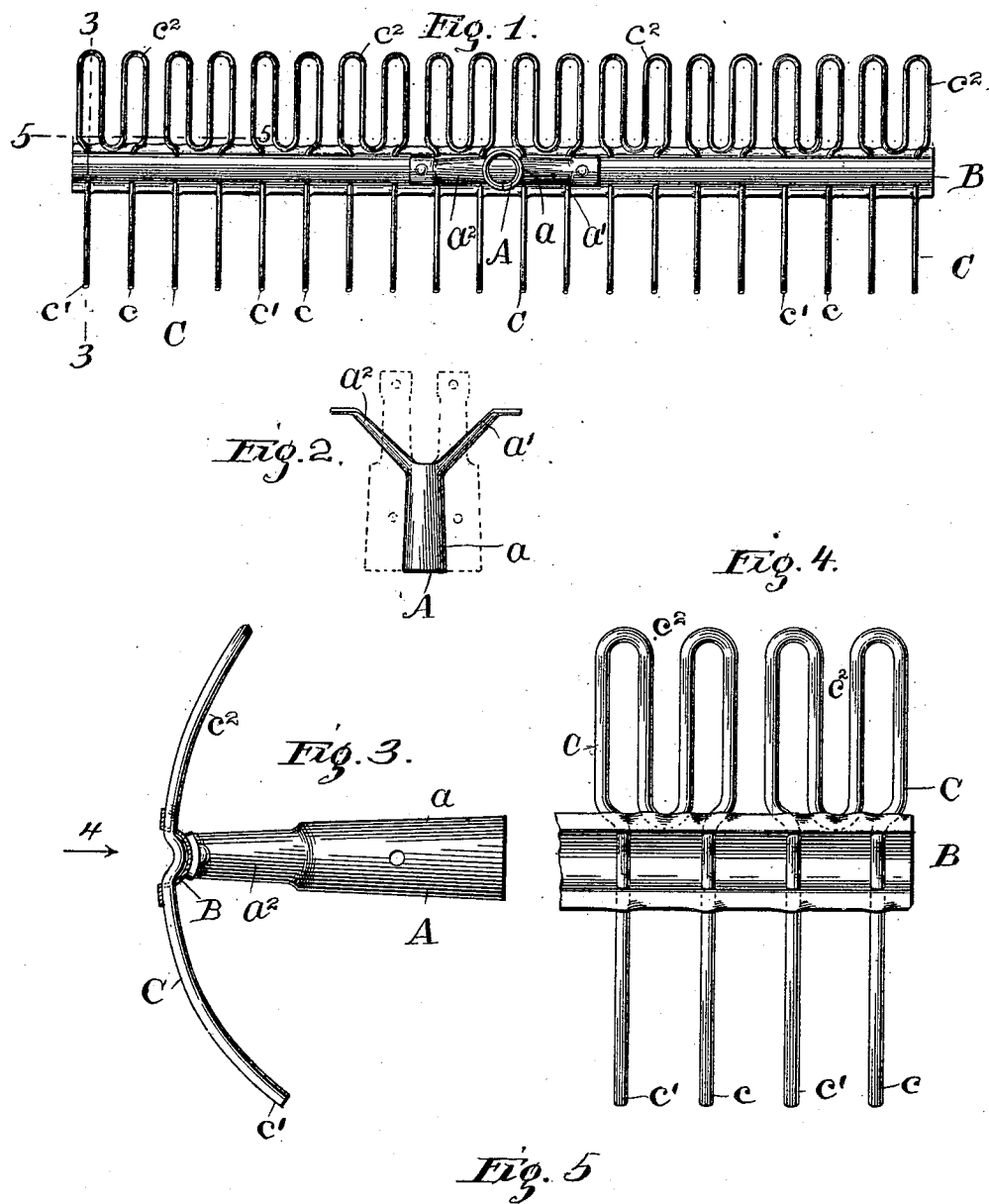

GEORGE J. ADAM, OF CHICAGO, ILLINOIS.

RAKE.

SPECIFICATION forming part of Letters Patent No. 676,525, dated June 18, 1901.

Application filed July 5, 1900. Serial No. 22,471. (No model.)

*To all whom it may concern:*

Be it known that I, GEORGE J. ADAM, a citizen of the United States of America, residing at Chicago, in the county of Cook and State of Illinois, have invented certain new and useful Improvements in Rakes, of which the following is a specification.

My invention relates to certain improvements in rakes, directed especially to the form and construction of the teeth and connecting-bar and also to the handle-socket.

The principal object of the invention is to provide a rake which shall be finer upon one side than the other and shall at the same time be of simple construction and ornamental in appearance; and to such end it consists in certain novel characteristics, which will be described and claimed below.

In the drawings, Figure 1 is a rear elevation of a rake-head; Fig. 2, a plan of the handle-socket; Fig. 3, a vertical transverse section in line 3 3 of Fig. 1; Fig. 4, an enlarged elevation upon the opposite side to that shown in Fig. 1, and Fig. 5 a horizontal section in line 5 5 in Fig. 1.

The handle-socket A is preferably formed of a single piece of sheet metal blanked out, as shown in dotted lines in Fig. 2, and formed to the shape shown in the other figures, furnishing a conical socket $a$ and diverging arms $a'$ $a^2$. The cross-bar B of the rake is secured to these arms and the middle portion is made concave upon the side opposite to the socket and perforated through the concave portion, as seen in Fig. 3. The teeth C are preferably made of wire, the ends $c\ c'$ extending from one side of the cross-bar B and the intermediate portion diverging and being formed into a double loop $c^2$, the central part of which is preferably brought down to the cross-bar and rests against the same. The end portions $c\ c'$ of the wire are preferably in line with the middle portions of the two members of the double loop. The double-loop form of the tooth on one side gives twice the ordinary number of teeth upon that side and yet does not interfere with the symmetry of the rake nor with the rigidity of the teeth in the head. After the teeth are inserted in the cross-bar they are stamped into the concave portion of said bar, as seen in Fig. 3, and held firmly against withdrawal.

I claim as new and desire to secure by Letters Patent—

1. In a rake-head, a series of teeth secured therein, having both ends extending from the head in the same direction and the intermediate portion extending from the opposite side in the form of a double loop, thereby providing twice as many double teeth upon the loop side of the rake as upon the side occupied by the ends of the teeth; substantially as described.

2. A tooth for rakes consisting of a piece of wire having its ends extending parallel to each other in the same direction and its middle portion formed in the shape of a double loop, the projecting end portions of the teeth being in line with the middle portions of the loops; substantially as described.

3. In a rake-head a wire tooth having the ends of the wire extending in the same direction and parallel to each other, the intermediate portion diverging, then extending in parallel directions opposite to that of the ends, then curving inward and back in the reverse direction, the portions of the double loop thus formed being at substantially equal distances; substantially as described.

In witness whereof I have hereunto set my hand at Chicago, in the county of Cook and State of Illinois, this 18th day of June, A. D. 1900.

GEORGE J. ADAM.

Witnesses:
 CHAS. O. SHERVEY,
 S. BLISS.